(12) United States Patent
Rao et al.

(10) Patent No.: US 7,329,434 B2
(45) Date of Patent: Feb. 12, 2008

(54) POLARIZING LAYER WITH ADHERENT PROTECTIVE LAYER

(75) Inventors: YuanQiao Rao, Pittsford, NY (US); Tomohiro Ishikawa, Rochester, NY (US); Paul T. Lubberts, Conesus, NY (US); Timothy C. Schunk, Livonia, NY (US)

(73) Assignee: Eastman Kodak Company, Rochester, NY (US)

( * ) Notice: Subject to any disclaimer, the term of this patent is extended or adjusted under 35 U.S.C. 154(b) by 167 days.

(21) Appl. No.: 11/064,372

(22) Filed: Feb. 23, 2005

(65) Prior Publication Data

US 2006/0187548 A1    Aug. 24, 2006

(51) Int. Cl.
    *B05D 5/06*    (2006.01)

(52) U.S. Cl. .................. 427/163.1; 427/162; 359/601; 428/141; 428/142

(58) Field of Classification Search ............. 427/163.1, 427/162; 359/601; 428/141, 142
See application file for complete search history.

(56) References Cited

U.S. PATENT DOCUMENTS

| 4,759,611 | A |   | 7/1988  | Downey, Jr. |
| 4,818,624 | A |   | 4/1989  | Downey, Jr. |
| 5,307,438 | A | * | 4/1994  | Bilkadi et al. ............. 385/141 |
| 5,676,885 | A |   | 10/1997 | Starzewski |
| 5,847,795 | A | * | 12/1998 | Satoh et al. ................ 349/137 |
| 6,141,078 | A | * | 10/2000 | Morii et al. ................ 349/155 |
| 6,552,145 | B1 |  | 4/2003  | Okada et al. |
| 6,773,121 | B2 | * | 8/2004  | Miyatake et al. .......... 359/601 |
| 7,026,422 | B2 | * | 4/2006  | Chang et al. ................ 528/13 |
| 2006/0084780 | A1 | * | 4/2006 | Hebrink et al. ............ 528/272 |

FOREIGN PATENT DOCUMENTS

| DE | 141 076     | 4/1980 |
| JP | 2001-206981 | 7/2001 |
| JP | 2002-215331 | 8/2001 |

\* cited by examiner

*Primary Examiner*—Alain L. Bashore
(74) *Attorney, Agent, or Firm*—Andrew J. Anderson; Paul A. Leipold

(57) ABSTRACT

The invention relates to a process for forming an integral protective layer on a polarizing layer comprising coating the layer with a sol, gelling the sol, and then curing the coating to form a contiguous crosslinked adherent protective layer.

19 Claims, 1 Drawing Sheet

POLARIZING LAYER WITH ADHERENT PROTECTIVE LAYER

FIELD OF THE INVENTION

This invention relates to polarizing plates and their manufacturing process. The polarizing plate according to the invention has improved dimensional stability and optical properties suitable for use in high definition image display devices such as Liquid Crystal Display (LCD) and Organic Light Emitting Diode Display (OLED).

BACKGROUND OF THE INVENTION

Polarizing plates (also commonly called "polarizers") are widely used in displays to control incoming and outgoing light. For example, in LCDs, a liquid crystal cell is typically situated between a pair of polarizer plates. Incident light polarized by the first polarizer plate passes through a liquid crystal cell and is affected by the molecular orientation of the liquid crystal, which can be altered by the application of a voltage across the cell. The altered light goes into the second polarizer plate. By employing this principle, the transmission of light from an external source, including ambient light, can be controlled. LCD's are quickly taking over from traditional CRTs in computer monitors and TVs because of their lower energy consumption and thinness.

The principle of OLED Display operation does not rely on the polarization state of light. In OLED Displays, organic compounds emit light as a current goes through, thus, no modulation of polarization is involved. However, in order to reject ambient light, OLED displays use a combination of an optical retardation film and a polarizer, such as a circular polarizer plate. In display applications including LCD and OLED, it is important that the degree of polarization, so called polarization efficiency, of the light through the polarizer plate is high. A low degree of polarization would result in inferior display performance.

Most of the polarizer plates currently used in displays are transmission-absorptive type. They polarize incident natural light by absorbing a component of the electric field oscillating in a particular direction. The transmitted light is linearly polarized. In order to generate the absorption-dichromatic polarizing element that functions over a wide range of visible spectrum, a sheet of polyvinyl alcohol (PVA) impregnated with iodine or organic dichroic dyes is stretched to produce a polarizing film. In most cases the absorption axis is parallel to the direction of stretch. Polarizing films composed of said oriented PVA sheet alone do not possess good humidity or temperature stability. Thus, they are sandwiched between two protective layers 101, 103, FIG. 1, to form a polarizing plate. Typically the protective layers are made from cellulose triacetate (TAC). The incoming un-polarized light 105 transmits through the protective layer 101, and is polarized through the polarizing film element 107. The linearly polarized light 109 comes out from the opposite side through the other protective layer 103. The protective layers must satisfy certain quality requirements: high transparency, low birefringence, dimensional stability against temperature and humidity, and chemical stability.

For display applications, overall light efficiency is an important factor for performance. Thus the protective film should be free from haze, high absorption, and coloration. Preferably, transmission of the protective film is above 90%. In LCDs, the polarization state of the light is modulated by changing the birefringence of the liquid crystal cell and additional birefringence contribution from polarizer protective layers often has to be suppressed. Also, a low birefringence protective layer enables efficient manufacturing of various combinations of polarizer and retarders.

Long-term reliability of the polarizer plates depends on two factors: chemical and dimensional stability. The function of a polarizing element 107 relies on the alignment and the chemical state of iodine or dichroic dyes embedded within it. In dichroic dye type polarizers, the desired absorption spectrum is given by a mixture of dichroic dyes possessing overlapping absorption bands to cover the intended useful light wavelength range. In iodine type polarizer films, the desired absorption spectrum is given by controlling the amount of poly-iodide ions, $I_3^-$ and $I_5^-$. The degree of polarization is directly related to the degree of alignment of these ionic species. If the ionic state or alignment is degraded, the polarization degree of light would not be satisfactory for display applications. Therefore, the protective layers have to be free from chemical species that can react with or diffuse into the polarizing element and alter the state of poly-ions or dyes.

Dimensional instability of the protecting layer(s) (101, 103) degrades the polarizer plate performance mainly by two mechanisms: photo elasticity and change in the local polarization direction. Due to the effect of photo elasticity, a protective layer would generate undesired birefringence on its own when it shrinks or expands due to temperature or humidity. With the birefringence in the protective layer, the linearly polarized light 109 exiting the polarizing element 107 will be altered to elliptically polarized light while it transmits through the second protective layer 103. In most cases, such a birefringence caused by photo elasticity is not uniform across the plane of the polarizer and thus creates an inhomogeneous brightness appearance in the display application. Even if the protective film has no photo elasticity, dimensional change can alter the local polarization direction as it is adhered to the polarizing element typically made from a film of polyvinyl alcohol.

Intrinsic birefringence describes the fundamental orientation of a material at a molecular level. It is directly related to the molecular structure (bond angles, rotational freedom, presence of aromatic groups, etc.) of the material. The intrinsic birefringence is not affected by process conditions (temperature, stresses, pressures) used to make a macroscopic object.

Crystalline and liquid crystalline materials have the convenient property that their intrinsic birefringence manifests itself almost perfectly when they are assembled into a macroscopic article. Layers of crystalline and liquid crystalline molecules often can be manufactured such that a preponderance of the molecules in the article are in registry with each other and thus preserve their fundamental orientation. The same is not true when making layers of an amorphous polymeric material. Their intrinsic birefringence can be highly modified by the manufacturing process. Thus, the measured birefringence of an actual article will be a resultant of its intrinsic birefringence and the manufacturing process. Because we are dealing with such amorphous polymeric materials, the following definitions refer to this measured birefringence and not intrinsic birefringence.

In-plane birefringence means the difference between $n_x$ and $n_y$, where x and y lie in the plane of the layer. $n_x$ will be defined as being parallel to the casting direction of the polymer, and $n_y$ being perpendicular to the casting direction of the polymer film. The sign convention used will be $n_x - n_y$.

Out of-plane birefringence means the difference between $n_z$ and the average of $n_x$ and $n_y$, where x and y lie in the plane of the layer and z lies in the plane normal to the layer. The sign convention used will be: $n_z-[(n_x+n_y)/2]$. TAC typically has a negative out of plane birefringence as its $n_z$ is smaller than its $n_x$ and $n_y$.

In-plane retardation (Re) means the product of in-plane birefringence and layer thickness (t). Thus $Re=t(n_x-n_y)$ Out-of-plane retardation (Rth) means the product of out-of-plane birefringence and layer thickness (t). Thus $Rth=t(n_z-[(n_x+n_y)/2])$.

TAC film has been widely used as the protective layers of polarizer plates. It is relatively simple to obtain low birefringence, especially in-plane, by adjustment of the casting process. This is due to a low intrinsic birefringence of TAC. By carefully choosing the dopant material to TAC (e.g., UV absorber, plasticizers), it is possible to prevent the degradation of the polarizing element (dyed PVA film) by chemical processes. Good optical properties (low haze, relatively high transmission) and its low cost make TAC attractive for this application.

Although TAC satisfies the essential requirements of the protective layers for polarizer plates, it has problems in birefringence and dimensional stability.

As mentioned above, it is possible to lower the birefringence of TAC by changing the casting conditions. This holds true for in-plane birefringence and it is typically $3\times10^{-5}$. However, there is typically residual out-of-plane birefringence on the order of $6\times10^{-4}$. Thus, TAC film with a thickness of 100 μm would have low in-plane retardation of 3 nm but the out-of-plane retardation (Rth) would be 60 nm. Such a high value of Rth is often a major concern in display applications. The generation of higher out-of-plane retardation is due to the stress generated in the film normal direction during the drying of solvent used during casting. A few modes of LCD utilize this residual Rth to enhance the viewing quality of LCDs. In some applications, it is preferable to have a much lower Rth contribution from the protective layer.

TAC can have high residual stress generated during the solvent casting process. This often contributes to its low dimensional stability. A dimension change in TAC, such as shrinkage, leads to a local change in the polarization direction or lowering of the degree of polarization.

Another problem with TAC is its high moisture permeability. TAC is generally adhered to polarizing film elements with a water soluble adhesion agent after saponification treatment of the TAC film surface. Thus, such humidity permeation leads to a delamination between the TAC and polarizing film element. Also, the ionic state of the dichroic components in the polarizing film element changes state in the presence of moisture leading to a lower degree of polarization of the outcoming light.

An additional complication in the polarizer plate manufacturing process is the saponification treatment required to prepare the TAC film surface for adhesion to the PVA polarizing film element. Since this involves treatment with strong alkaline solution, it raises environmental and working safety concerns, as well as being a source of protective layer non-uniformity defects. Such a strong alkaline treatment combined with the use of plasticizer and other dopant in TAC, can result in segregation, so called bleeding problems. Therefore, it is desirable to eliminate the need for saponification treatment from the polarizer plate manufacturing process.

JP 2001-206981 discloses a process to manufacture cellulose ester film having low Rth. The process involves dissolving cellulose ester into a solvent containing bromopropane. As bromopropane has a higher boiling point than the more generally used solvent, methylene chloride, the slow evaporation process is intended to relax the polymer chain. Reduction in the Rth of TAC from 85 nm to 25~40 nm was claimed. However, the residual Rth is still significant and the use of such a solvent poses a significant potential health hazard.

Other well-known polymeric materials having low birefringence are polynorbornene type polymers. Films of such polymers made by solvent casting or extrusion processes usually shows a few nm in Rth. Not only do such polymer films have low birefringence, also they exhibit low moisture permeation and high dimensional stability. U.S. Pat. No. 6,552,145 discloses use of such a polymer as a protective layer for a polarizer plate. Though various desirable characteristics are shown, the cost of such a film is generally much higher than TAC. Also, adhesion of such polymer layers to PVA is a significant challenge as compared to that of cellulose ester films. JP2001-215331 teaches art in which a protective layer film is comprised of a core layer and a layer of cellulose derivative disposed on at least one side of the core layer. By having the layer of cellulose derivative, adhesion to PVA can be improved. However, such an extra coating process only increases the manufacturing cost of polarizer protective layers.

Therefore, there is a need for a new protective layer for polarizing plates having low in-plane and out-of-plane birefringence and higher dimensional stability than TAC. Yet another need exists for a process to provide such a protective layer for polarizing elements that is free from the need to use strong alkaline solutions, that pose environmental and work-safety concerns.

Problem to be Solved by the Invention

Accordingly, it would be desirable to provide a polarizer protective layer possessing low in-plane and out-of-plane birefringence. It would be desirable to have a polarizer protective layer with better dimensional stability. Furthermore, it would be desired to be able to form the polarizer plate using an easy processing procedure.

SUMMARY OF THE INVENTION

It is an object of the invention to overcome the disadvantages of previous protective layers for polyvinyl alcohol film polarizers in the formation of polarizer plates used in display devices.

It is another object to provide polarizer protective layers having low in-plane and out-of-plane birefringence.

It is yet another object to provide polarizer plates with improved dimensional stability.

These and other objects of the invention are accomplished by a process for forming an integral protective layer on a polarizing polyvinyl alcohol polymer film comprising coating the polarizing film with a sol, gelling the sol, and then curing the coating to form a contiguous cross-linked adherent protective layer in the production of a polarizing plate.

Advantageous Effects of the Invention

The invention provides a polarizer plate protective layer having low in-plane and out-of-plane birefringence. The invention also provides a polarizer plate protective layer with good dimensional stability. The invention further provides an inexpensive process for the manufacture of polarizer plates.

DETAILED DESCRIPTION OF THE INVENTION

Figure 1:
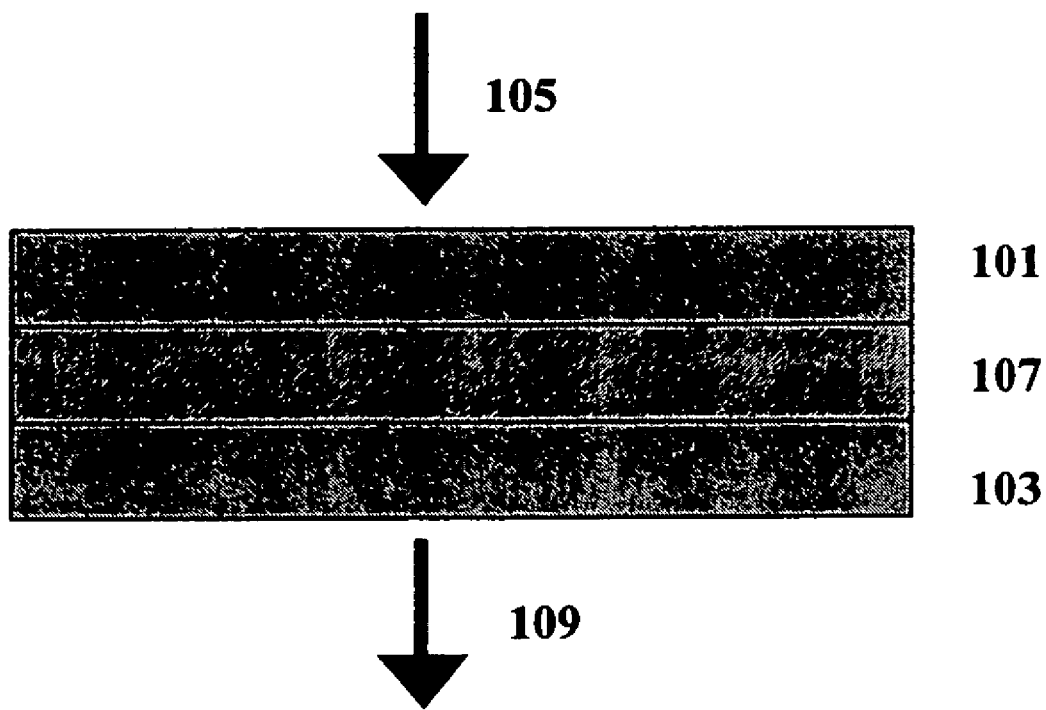
FIG. 1 shows the cross section of a polarizer plate.

The invention has numerous advantages. The invention provides a protective layer for a polarizer film that has low in-plane and out-of-plane retardation. The invention provides a less expensive method of forming a polarizer plate, as adhesive joining the protective layers to the polarizer film is not required. The invention provides a polarizer plate of good dimensional stability. The invention provides a protective layer for a polarizer film with good resistance to moisture permeation. These and other advantages will be apparent from the detailed description below.

As shown in FIG. 1 a polarizer plate may comprise three layers with a core layer of a polarizing film (107) and on both sides of the polarizing film, two protective layers. (101 and 103)

It has been found in the present invention that an improved polarizer plate may be formed by having a crosslinked protective layers. One way to generate the crosslinked protective layer is through sol-gel processing. It is realized by the casting of an integral layer of sol onto a polyvinyl alcohol polymer polarizing film. The sol is cast onto one or both sides of the polarizing film, gelled and then cured to form a integral protective layer. Integral as used herein means the joining of two layers such that they can not be separated and maintain the integrity of the layers.

Typical sol-gel processing includes hydrolysis and condensation.

In hydrolysis:

$$MRx(OR')_y + H_2O \rightarrow MR_x(OR')_{y-1}-OH + R'OH$$

wherein M is a metal atom, R and R' are substituents, and x, y are integers.

In condensation:

$$MA-OH + MB-OH \rightarrow MA-O-MB + H2O$$

$$MA-OR + MB-OH \rightarrow MA-O-MB + ROH$$

wherein M is a metal atom, A, B and R are substituents.

The sol utilized in the invention may be any material that will provide a layer of low in-plane and out-of-plane birefringence and has the ability to adhere to the polyvinyl alcohol polymer film to form an integral layer therewith. A polymer chain which has a Tg of less than 25° C. is in a rubbery state at room temperature and thus possessing a low birefringence because of the ability of any recovery of stress induced birefringence. However it is mechanically compliant. When it is crosslinked telechelically, it can form a material with low birefringence as well as good mechanical integrity and dimensional stability. One type of telechelic cross linking is to use silica. [EKC1]Suitable sol materials are silicon alkoxide end grouped oligomers of siloxane, ethylene oxide, acrylate, acrylamide, vinyl and copolymers thereof. A preferred oligomer is siloxane as it provides zero in-plane and out-of-plane birefringence and good dimensional stability. The formation of an embodiment of the invention is illustrated here.

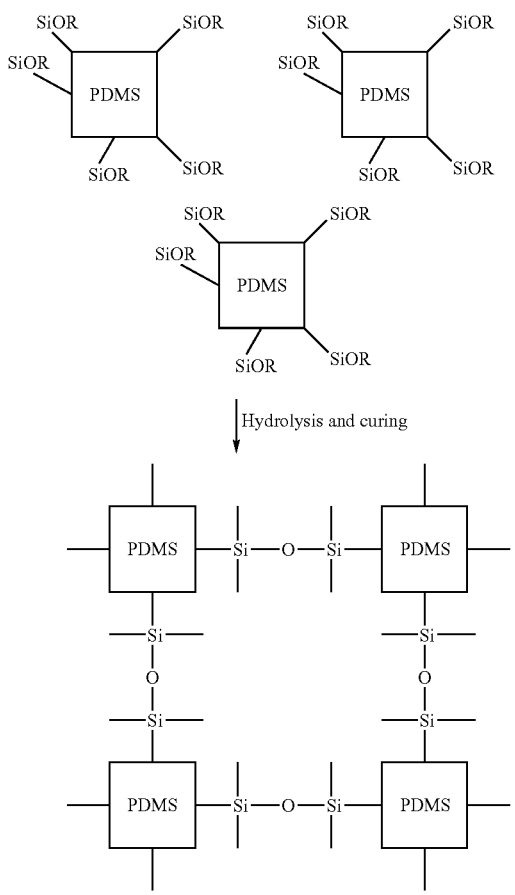

Where R is substituent, alkyl or aromatic; PDMS is polydimethylsiloxane.

There may be either no solvent or solvent present while coating the sol. A variety of solvents may be used, such as THF, lower alcohols, ketones, toluene, acetate esters, formamides and dioxane. It is preferred not to use solvent so as to reduce the shrinkage of the layer upon drying, and to be benign to the environment.

Catalyst may be used to promote the hydrolysis in the preparation of the sol and later gelation of the sol. Suitable catalysts include but are not limited to base, acid, and titanium alkoxide or vanadium alkoxide and various oxides. Commonly used base catalysts include ammonia, KOH and amines. Commonly used acid catalysts include mineral acids, acetic acid and HF.

The gelling of the sol can be achieved through drying. Drying temperatures may conveniently be in the range of 25° C. to 75° C. Drying temperatures may preferably be between 40° C. and 75° C. because too high a drying temperature may degrade the polyvinyl alcohol polarizing film and too low a drying temperature requires excessive time to dry.

The thus formed protective layer(s) can have a wide range of thicknesses from 5 micron to 100 micron. It is preferred to have a thickness between 10 to 60 microns such that the resulting protective layer has sufficient physical integrity. The thickness is preferred to be thinner than conventionally used TAC (about 80 micron) such that the overall thickness of the polarizer plate and finished display can be reduced.

Preparation of Polarizing Film

Polarizing film can be prepared on commercial scale processing equipment designed for the production of display grade polarizers. As described, for example, in US20020162483A1 Section 0224, polyvinyl alcohol (PVA) film in excess of 98% degree of hydrolysis is swollen in water and uniaxially stretched. The resulting film is subsequently immersed in an aqueous solution of iodine and potassium iodide to provide the well-known complex with PVA. The polarizing film is then further immersed in an aqueous solution of potassium iodide and boric acid, washed with water, and dried.

It is common practice to produce a polarizing film by stretching a film of polyvinyl alcohol (PVA) and then causing the poly-iodide ($I^-$, $I_3^-$, and $I_5^-$) to be absorbed as a polarizing element in the resulting oriented film. Those polarizers making use of iodine as a polarizing element have good initial performance but generally have poor resistance to water or heat. Under conditions of high temperature and high humidity these polarizers may display a problem in durability. Thus, it is well known in the art to use dichroic organic dyes as a replacement for iodine in the polarizers. Many examples of dichroic organic dyes for polarizing films may be found in the patent literature, for example: U.S. Pat. Nos. 5,310,509, 5,340,504, 5,446,135, JP 2002296417, JP 2000329936, JP 05273788, JP 63243166, EP 549342, U.S. Pat. No. 5,667,719, and the journal literature such as Proceedings of the SPIE-Int. Soc. Opt. Eng. Vol. 2407 pp. 62-72, "Highly Durable Dyed Polarizer for Use in LCD Projections." Polarizing films making use of dichroic organic dye as a polarizing element have better durability against water and heat compared with polarizing films using iodine. It is common practice to use water soluble azo dyes for the manufacture of polarizing films. Combinations of two or more dyes make it possible to produce polarizing films dyed in various hues. It is common to use multiple dyes with a high degree of dichroism to provide a neutral hue to the polarizing film.

Examples of such dichroic organic dyes (Colour Index Generic Name) include the following but are not limited thereto: C.I. Direct Yellow 12, C.I. Direct Blue 202, C.I. Direct Red 31, C.I. Direct Yellow 44, C.I. Direct Yellow 28, C.I. Direct Orange 107, C.I. Direct Red 79, C.I. Direct Blue 71, C.I. Direct Blue 78, C.I. Direct Red 2, C.I. Direct Red 81, C.I. Direct Violet 51, C.I. Direct Orange 26, C.I. Direct Red 247, C.I. Direct Blue 168, C.I. Direct Green 85, C.I. Direct Brown 223, C.I. Direct Brown 106, C.I. Direct Yellow 142, C.I. Direct Blue 1, C.I. Direct Violet 9, C.I. Direct Red 81, Chemical Abstracts Registry Number 6300-50-1, Chemical Abstracts Registry Number 134476-95-2, Chemical Abstracts Registry Number 169454-83-5, and C.I. Direct Blue 98.

The casting of sol on polyvinyl alcohol polarizing film can be done through conventional coating processes, such as blade, hopper, and dip coating. It can be coated simultaneously to the both sides of the polarizing film. It can also be coated one side of the polarizing film, dried and subsequently coated on the other side of the polarizing film. The inventive protective layer can be put on one side of the polarizing film with the other side protective layer being TAC film.

The following examples illustrate the practice of this invention. They are not intended to be exhaustive of all possible variations of the invention. Parts and percentages are by weight unless otherwise indicated.

EXAMPLES

Materials:

APS-262 and APS-294 were supplied by Advanced Polymer Inc. Both materials are oligomeric siloxane with methoxy end groups. The materials were analyzed by gas chromatography mass spectrometry (GC/MS), matrix assisted laser desorption/ionization (MALD/I) mass spectrometry, and nuclear magnetic resonance (NMR). The analysis suggested a chemical structure as illustrated in the following:

An A series

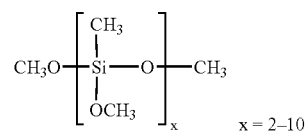

x = 2–10 plus a small amount of a B series,

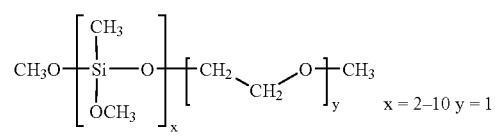

x = 2–10 y = 1

APS-262

An A series

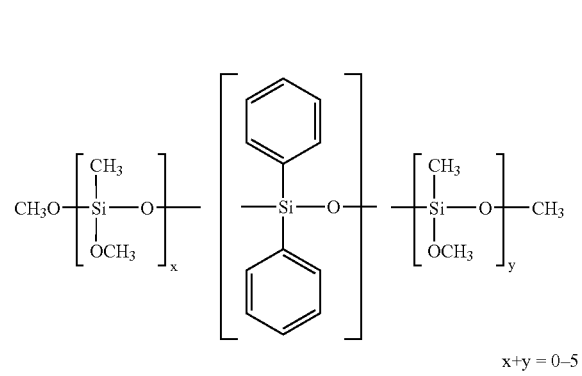

x+y = 0–5 a measurable amounts of a B series,

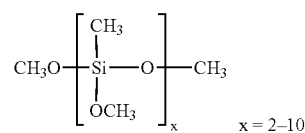

x = 2–10 plus a small amount of a C series,

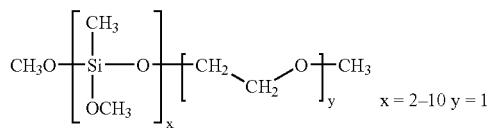

APS-294 (mixture)

Catalyst API Catalyst 5 is also provided by Advanced Polymer Inc. This catalyst is based on titanium alkoxide.

Evaluation:

In-plane, out-of-plane birefringence and transmittance were measured using a Woollam M-2000V Spectroscopic Ellipsometer.

Water Vapor Transmission Rate (WVTR) was measured using a Mocon tester in compliance with ASTM-1249.

Dimensional change at elevated temperature was measured using a TA Instruments TMA. The sample was heated to a set temperature at a rate of 10° C./min, and then soaked for 5 mins at that temperature. The dimensional change was then recorded.

Polarizer Protection Evaluation

Polarizer efficiency and photopic transmittance are two parameters to characterize the performance of polarizer.

Polarizer plate photopic transmission and polarization efficiency were measured using a Perkin-Elmer Lmabda 2spectrophotometer. Photopic transmission was calculated as per CIE standard procedure using D65 illumination:

$$Y = k \int_{380}^{780} y(\lambda) \Phi(\lambda) d\lambda.$$

Polarization efficiency was calculated as:

$$PE = 100 \left[ \frac{(Y_\| - Y_\perp)}{(Y_\| + Y_\perp)} \right]^{1/2}$$

An aging study was conducted on a polarizer. The polarizer was put in a high humidity oven at 60° C., 90% RH for 500 hours. The polarizer efficiency and photopic transmittance was measured before the aging and recorded as IPE(initial polarizer efficiency) and IY (initial photopic transmission). After the aging, the change in the polarizer efficiency (CPE) and photopic transmittance(CPT) were recorded:

CPE=PE before aging-PE after aging

CPT=Y before aging-Y after aging

Example 1

APS-294 was coated using a coating blade on bare PET film. The film is allowed to dry at ambient conditions for 24 hours. A 44 micron dried free-standing film was obtained after peeling from the PET film. The film showed 0.14 nm in-plane retardation and −0.11 nm out-of-plane retardation, thus the in-plane birefringence ($n_x-n_y$) was $3.2\times10^{-6}$ and out-of-plane birefringence ($n_z-(n_x+n_y)/2$) was $-2.5\times10^{-6}$. The transmittance of the film was 95%. The WVTR of the film was 503 g/m²/day, or 0.022 g*m/m²/day. The dimensional change at 150° C. was 0.1%.

Comparative Example 1

Cellulose triacetate resin was dissolved in methylene chloride and methanol (95:5) and cast on a polished metal coating wheel. An 80 micron thick film was obtained. The film was measured to have an in-plane retardation of 2.64 nm and out-of-plane retardation is 51 nm. The TAC film showed an in-plane birefringence of $3.3\times10^{-5}$ and an out-of-plane birefringence of $6.3\times10^{-4}$. The WVTR of the film was measured to be 513 g/m²/day, or 0.041 g*m/m²/day. The dimensional change at 150° C. was 0.5%.

The above results show that the inventive layer is optically clear, has lower in-plane and out-of-plane birefringence, better resistance to water vapor transmission and better dimensional stability at elevated temperature than the comparative cellulose triacetate layer.

Example 2

APS-294 was coated on a PVA polarizer film with TAC protective layer on the opposite side using a coating knife. A 15 micron layer is formed on PVA after the coating was dried at ambient condition for 24 hours. The polarizer efficiency and photopic transmittance of the coated polarizer was then measured after drying. Afterwards, the coated polarizer is put in a high humidity oven at 60° C., 90% RH for 500 hours and again the polarizer efficiency and photopic transmittance was measured again.

Example 3

After removing protective layer from one side of a polarizer (Sumitomo), APS-294 was coated on a PVA polarizer film using a coating knife. A 8 micron layer is formed on PVA after the coating was dried at ambient condition for 24 hours. The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Example 4

After removing protective layer from one side of a polarizer (Sumitomo), APS-294 was coated on a PVA polarizer film using a coating knife. A 11 micron layer is formed on PVA after the coating was dried at ambient condition for 24 hours. The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Example 5

After removing protective layer from one side of a polarizer (Sumitomo), APS-294 was coated on a PVA polarizer film using a coating knife. A 26 micron layer is formed on PVA after the coating was dried at ambient condition for 24 hours.

The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Example 6

After removing protective layer from one side of a polarizer (Sumitomo), APS-262 with 0.5% catalyst of API-Catalyst 4, was coated on a PVA polarizer film using a coating knife. A 26 micron layer is formed on PVA after the coating was dried at ambient condition for 24 hours. The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Example 7

After removing both sides of protective layers from a polarizer (Palotechno), APS-294 were coated on both sides of a PVA polarizer film using a coating knife. Two 8 micron layers are formed on PVA. The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Example 8

After removing both sides of protective layers from a polarizer (Palotechno), APS-294 were coated on both sides of a PVA polarizer film using a coating knife. Two 11 micron layers are formed on PVA. The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Example 9

After removing both sides of protective layers from a polarizer (Palotechno), APS-294 were coated on both sides of a PVA polarizer film using a coating knife. Two 26 micron layers are formed on PVA. The polarizer efficiency and photopic transmittance of the coated polarizer was then measured after drying. Afterwards, the coated polarizer is put in a high humidity oven at 60° C., 90% RH for 500 hours and the polarizer efficiency and photopic transmittance was measured again.

Comparative Example 2 a commercially available polarizer plate laminated with 80 micron TAC was used as a comparison. The polarizer efficiency and photopic transmittance of the polarizer was measured. The polarizer is then put in a high humidity oven at 60° C., 90% RH for 500 hours and the polarizer efficiency and photopic transmittance was measured again.

Comparative Example 3 another commercially available polarizer plate laminated with 40 micron TAC was used as a comparison. The polarizer efficiency and photopic transmittance of the polarizer was measured. The polarizer is then put in a high humidity oven at 60° C., 90% RH for 500 hours and the polarizer efficiency and photopic transmittance was measured again.

Comparative Example 4 another commercially available polarizer plate laminated with 80 micron TAC was used as a comparison. The polarizer efficiency and photopic transmittance of the polarizer was measured. The polarizer is then put in a high humidity oven at 60° C., 90% RH for 500 hours and the polarizer efficiency and photopic transmittance was measured again.

The polarizer evaluation results are listed in the following table.

|  | PE | CPE | CPT |
|---|---|---|---|
| Example |  |  |  |
| 2 | 99.78 | −0.07 | −4.1 |
| 3 | 99.96 | −0.17 | −0.17 |
| 4 | 99.96 | −0.15 | −0.01 |
| 5 | 99.97 | −0.19 | 0 |
| 6 | 99.96 | −0.05 | −0.04 |
| 7 | 99.98 | −0.1 | 0.01 |
| 8 | 99.94 | −0.08 | −0.03 |
| 9 | 99.88 | −0.06 | 0 |
| comparative example |  |  |  |
| 2 | 99.92 | 0.02 | −4.1 |
| 3 | 99.79 | 0.02 | −1.39 |
| 4 | 99.98 | 0.09 | −3.05 |

The above table shows that the inventive coated polarizer sheet sustains the polarizer function as well as the comparative example at a thickness range of 41 microns to 85 microns, and at either one side or both sides of a polarizing layer. The inventitive coated polarizer plates are generally thinner than the comparative examples, which have a thickness of 105 to 185 microns. Thus the inventive coated polarizer plate is advantageous to generate a thinner and cheaper polarizer plate.

The invention has been described in detail with particular reference to certain preferred embodiments thereof, but it will be understood that variations and modifications can be effected within the spirit and scope of the invention.

The invention claimed is:

1. A process for forming an integral protective layer on a polarizing layer comprising coating the polarizing layer with a sol, gelling the sol, and then curing the coating to form a contiguous crosslinked adherent integral protective layer, wherein said integral protective layer has a thickness from 5 micrometers to 100 micrometers further wherein said integral protective layer has an absolute in-plane birefringence of less than $10^{-5}$ and an absolute out-of-plane birefringence of less than $10^{-4}$ for light in the visible spectrum.

2. The process of claim 1 wherein said sol comprises an oligomeric compound having therein cross-linkable terminal groups.

3. The process of claim 2 wherein said sol comprises oligomers of siloxane, acrylate, acrylamide, vinyl or copolymers thereof, having therein silicon alkoxide terminal groups.

4. The process of claims 3 wherein the Tg of the oligomer is lower than 25 degrees C.

5. The process of claim 1 wherein said sol comprises a silicon alkoxide terminated siloxane oligomer.

6. The process of claim 5 wherein said siloxane oligomer comprises diphenyl siloxane.

7. The process of claim 1 wherein the coating is carried out without the use of solvent.

8. The process of claim 1 wherein said sol further comprises a catalyst to promote sol preparation and gelling.

9. The process of claim 1 wherein said curing is carried out at less than 75 degrees C.

10. The process of claim 1 wherein said polarizing layer comprises polyvinyl alcohol.

11. The process of claim 1 wherein said polarizing layer comprises iodine.

12. The process of claim 1 wherein said polarizing layer comprises at least one dichroic organic compound.

13. The process of claim 1 wherein said integral protective layer has a thickness of between 10 and 60 micrometers.

14. The process of claim 1 wherein integral protective layers are simultaneously coated on both sides of said polarizing layer.

15. The process of claim 1 wherein integral protective layers are sequentially coated on both sides of said polarizing layer.

16. The process of claim 1 wherein said integral protective layer is coated on only one side of said polarizing layer.

17. The process of claim 1 wherein said integral protective layer is stable such that its percentage change in lateral dimension at a temperature of between 80 and 150 degrees C. is less than 1%.

18. The process of claim 1 wherein said integral protective layer has a water vapor permeability of less than 0.05 g*m/m$^2$/day.

19. The process of claim 1 wherein said integral protective layer has an absolute in-plane retardation of less than 10 nm and an absolute out-of-plane retardation of less than 70 nm.

* * * * *